US008594488B1

(12) United States Patent
Grundmann et al.

(10) Patent No.: US 8,594,488 B1
(45) Date of Patent: Nov. 26, 2013

(54) METHODS AND SYSTEMS FOR VIDEO RETARGETING USING MOTION SALIENCY

(75) Inventors: Matthias Grundmann, Atlanta, GA (US); Vivek Kwatra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/419,231

(22) Filed: Mar. 13, 2012

(51) Int. Cl.
*G11B 27/00* (2006.01)
*H04N 5/93* (2006.01)
*H04N 9/80* (2006.01)
*H04N 5/225* (2006.01)
*H04N 5/228* (2006.01)
*H04N 5/14* (2006.01)
*H04N 9/64* (2006.01)

(52) U.S. Cl.
USPC ........... 386/278; 386/239; 386/248; 386/280; 348/169; 348/170; 348/171; 348/172; 348/208.14; 348/700; 348/701

(58) Field of Classification Search
USPC ............ 348/169, 170, 171, 172, 208.14, 700, 348/701; 386/239, 248, 278, 280
See application file for complete search history.

(56) References Cited

U.S. PATENT DOCUMENTS

| 8,233,094 | B2* | 7/2012 | Subbotin et al. | 348/700 |
| 2004/0258307 | A1* | 12/2004 | Viola et al. | 382/190 |
| 2007/0250898 | A1* | 10/2007 | Scanlon et al. | 725/135 |
| 2012/0093361 | A1* | 4/2012 | Huang et al. | 382/103 |

OTHER PUBLICATIONS

Smith, Brandon et al., "Light Field Video Stabilization", IEEE International Conference on Computer Vision (ICCV), Sep. 29-Oct. 2, 2009.
Gleicher, Michael et al., "RE-Cinematography: Improving the Camera Dynamics of Casual Video", ACM Multimedia 2007, Sep. 2007.
Liu, Feng et al., "Content-Preserving Warps for 3D Video Stabilization", ACM Transactions on Graphics (Proceedings of ACM SIGGRAPH 2009), vol. 28, Nov. 3, 2009.

\* cited by examiner

*Primary Examiner* — Daquan Zhao
(74) *Attorney, Agent, or Firm* — McDonnell Boehnen Hulbert and Berghoff

(57) ABSTRACT

Methods and systems for video retargeting and view selection using motion saliency are described. Salient features in multiple videos may be extracted. Each video may be retargeted by modifying the video to preserve the salient features. A crop path may be estimated and applied to a video to retarget each video and generate a modified video preserving the salient features. An action score may be assigned to portions or frames of each modified video to represent motion content in the modified video. Selecting a view from one of the given modified videos may be formulated as an optimization subject to constraints. An objective function for the optimization may include maximizing the action score. This optimization may also be subject to constraints to take into consideration optimal transitioning from a view from a given video to another view from another given video, for example.

22 Claims, 13 Drawing Sheets

COMPUTER PROGRAM PRODUCT 1200

SIGNAL BEARING MEDIUM 1201

PROGRAM INSTRUCTIONS 1202

- RECEIVING A PLURALITY OF VIDEOS, EACH VIDEO COMPRISING A SEQUENCE OF FRAMES

- DETERMINING SALIENT FEATURES IN A CONTENT OF EACH VIDEO, WHEREIN THE SALIENT FEATURES INCLUDE FEATURES SELECTED BASED ON MOTION CONTENT OF THE FEATURES OVER THE SEQUENCE OF FRAMES

- DETERMINING A CAMERA CROP PATH FOR EACH VIDEO, WHEREIN THE CAMERA CROP PATH COMPRISES A SEQUENCE OF CROP WINDOWS, THE SEQUENCE OF CROP WINDOWS INCLUDING THE SALIENT FEATURES

- APPLYING THE SEQUENCE OF CROP WINDOWS FOR EACH VIDEO TO THE SEQUENCE OF FRAMES OF EACH VIDEO TO GENERATE A MODIFIED VIDEO FOR EACH VIDEO INCLUDING THE SALIENT FEATURES OF EACH RESPECTIVE VIDEO

- DETERMINING AN ACTION SCORE ASSOCIATED WITH A PORTION OF EACH MODIFIED VIDEO, WHEREIN THE ACTION SCORE IS BASED ON AN AVERAGE MOTION MAGNITUDE OF THE SALIENT FEATURES IN THE PORTION OF EACH MODIFIED VIDEO

- BASED ON THE ACTION SCORE OF EACH MODIFIED VIDEO, SELECTING ONE OF THE MODIFIED VIDEOS

| COMPUTER READABLE MEDIUM 1203 | COMPUTER RECORDABLE MEDIUM 1204 | COMMUNICATIONS MEDIUM 1205 |
|---|---|---|

FIGURE 12

METHODS AND SYSTEMS FOR VIDEO RETARGETING USING MOTION SALIENCY

BACKGROUND

Content aware image editing involves several techniques aimed at displaying images without distortion on various media (e.g., cell phones, PDAs). Image editing may involve defining paths of least importance in an image and removing these paths to reduce image size or moving a crop window to cover salient objects within a frame. Editing may also involve manually defining areas in which pixels may not be modified, and offer the ability to remove whole objects from photographs.

Similarly, content aware video editing involves reconstructing or processing the video for better viewership. In sport events, for example, several cameras may be used to record a game. The operator of each camera may focus on action and also may attempt to anticipate future events. The operator may employ video techniques such as subtle zoom, constant velocity panning, and avoidance of sudden jerks to provide a pleasant experience for viewers. A director may determine which cameras should be broadcast live during the game in real-time.

Alternatively, the game may be recorded. Content of videos recorded by various cameras used for recording the event may be edited to produce a final video showing selected features and moments of the game. Editing the content of the videos may attempt to include moments of action and choose the camera that has a given view at a given moment in time. A final video may adhere to professional production techniques.

SUMMARY

Systems and methods for video retargeting using motion saliency are disclosed. In one aspect, a method is described. The method may comprise receiving a plurality of videos, each video comprising a sequence of frames. The method also may comprise determining salient features in a content of each video that include features selected based on motion content of the features over the sequence of frames. The method further may comprise determining a camera crop path for each video. The camera crop path may comprise a sequence of crop windows and the sequence of crop windows may include the salient features. The method may further comprise applying the sequence of crop windows to the sequence of frames of each respective video to generate a modified video for each video including the salient features of each respective video. The method may further comprise determining an action score associated with a portion of each modified video. The action score may be based on an average motion magnitude of the salient features in the portion of each modified video. Based on the action score, the method may further comprise selecting one of the modified videos.

In another aspect, a non-transitory computer readable medium having stored therein instructions that, in response to execution by a computing device, cause the computing device to perform operations is described. The operations may comprise receiving a plurality of videos, each video comprising a sequence of frames. The operations also may comprise determining salient features in a content of each video that include features selected based on motion content of the features over the sequence of frames. The operations may also comprise determining a camera crop path for each video. The camera crop path may comprise a sequence of crop windows and the sequence of crop windows may include the salient features. The operations may further comprise applying the sequence of crop windows to the sequence of frames of each respective video to generate a modified video for each video including the salient features of each respective video. The operations may further comprise determining an action score associated with a portion of each modified video. The action score may be based on an average motion magnitude of the salient features in the portion of each modified video. Based on the action score, the operations may further comprise selecting one of the modified videos.

In still another aspect, a system is provided that comprises a motion saliency engine, a video retargeting engine, and a view selection engine. The motion saliency engine may be configured to receive a plurality of videos and to determine salient features in a content of each video that include features selected based on motion content of the features over the sequence of frames. The video retargeting engine may be in communication with the motion saliency engine and configured to determine a camera crop path for each video. The camera crop path may comprise a sequence of crop windows and the sequence of crop windows may include the salient features. The video retargeting engine may also be configured to apply the sequence of crop windows for each video to the sequence of frames of each video to generate a modified video for each video including the salient features of each respective video. The view selection engine may be in communication with the motion saliency engine and the video retargeting engine and configured to determine an action score associated with a portion of each modified video. The action score may be based on an average motion magnitude of the salient features in the portion of each modified video. Based on an action score, the view selection engine may be configured to select one of the modified videos.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 12 is a schematic illustrating a conceptual partial view of an example computer program product that includes a computer program for executing a computer process on a computing device, arranged according to at least some embodiments presented herein.

DETAILED DESCRIPTION

The following details describe various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

This disclosure may disclose, inter alia, systems and methods for retargeting multiple synchronized recorded videos and selecting a view from the multiple videos to display. Salient features in multiple videos may be extracted. Each video may be retargeted by modifying the video to preserve the salient features. A crop path may be estimated and applied to a video to retarget each video and generate a modified video preserving the salient features. An action score may be assigned to portions or frames of each modified video to represent motion content in the modified video. Selecting a view from one of the given modified videos may be formulated as an optimization subject to constraints. An objective function for the optimization may include maximizing the action score. This optimization may also be subject to constraints to take into consideration optimal transitioning from a view from a given video to another view from another given video, for example.

I. Example Multi-Video Retargeting and View Selection System

Figure 1:
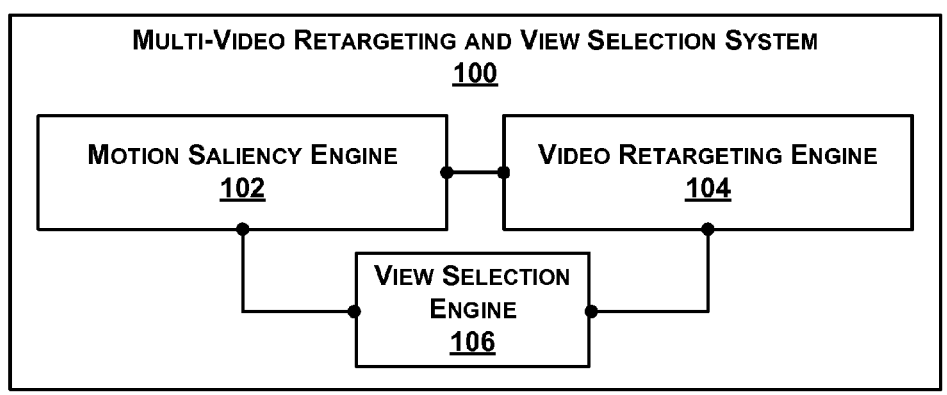
FIG. 1 illustrates a block diagram of an example multi-video retargeting and view selection system.

FIG. 1 is a block diagram illustrating an example multi-video retargeting and view selection system 100. The multi-video retargeting and view selection system 100 includes a motion saliency engine 102, a video retargeting engine 104, and a view selection engine 106, each coupled to or in communication with the other via wired or wireless links. The multi-video retargeting and view selection system 100 may be configured to receive multiple videos, and to perform video retargeting and view selection processes on the multiple videos. For example, the motion saliency engine 102 may receive the videos and may determine salient features of each video or a group of videos. Salient features may include visually prominent features in a video determined based on motion of objects within the video. The video retargeting engine 104 may then estimate a camera crop path that may be applied to each video to generate a modified video that preserves at least some of the salient features determined by the motion saliency engine 102. The view selection engine 106 may select a view from one of the modified videos based on certain criteria and constraints.

One or more of the described functions or components of the system 100 may be divided up into additional functional or physical components, or combined into fewer functional or physical components. In some further examples, additional functional and/or physical components may be added to the examples illustrated by FIG. 1. Still further, any of the motion saliency engine 102, the video retargeting engine 104, and/or the view selection engine 106 may include or be provided in the form of a processor (e.g., a microprocessor, a digital signal processor (DSP), etc.) configured to execute program code including one or more instructions for implementing logical functions described herein. The system 100 may further include any type of computer readable medium (e.g., non-transitory medium), for example, such as a storage device including a disk or hard drive, to store the program code.

Figure 2A:
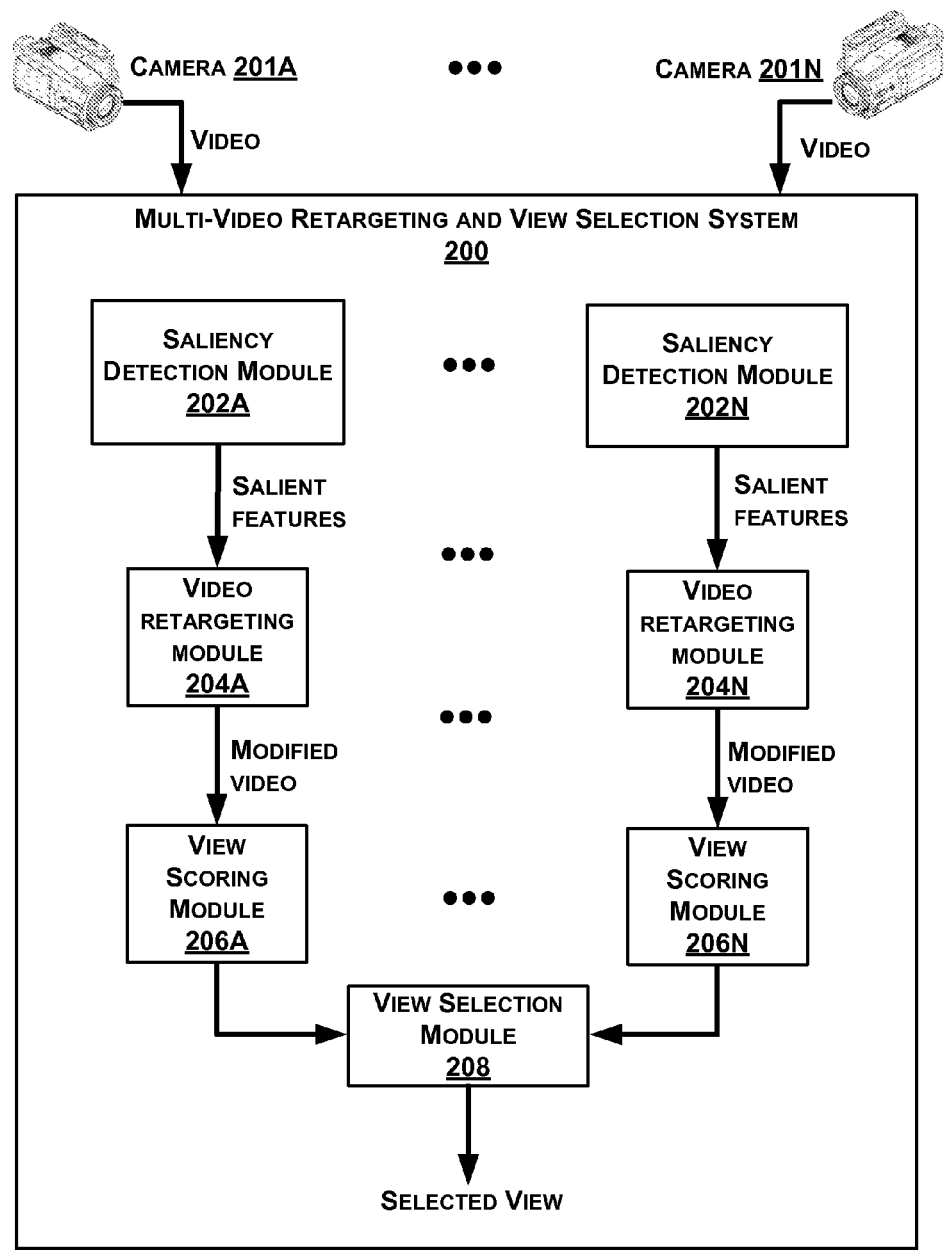
FIGS. 2A-2B illustrate a block diagram of example multi-video processing systems.

FIG. 2A is a block diagram of an example multi-video processing system 200. FIG. 2A includes cameras 201A-N. Videos recorded by cameras 201A-N are received by system 200. System 200 may include saliency detection modules 202A-N to determine salient features in a given received video. System 200 may also include video retargeting modules 204A-N that may produce modified videos by imposing constraints that require a modified video to preserve salient features and objects. System 200 may further include view scoring modules 206A-N that assign action scores to modified videos at a given time. An action score may represent an average motion magnitude of the salient features included in the content of each modified video at given time.

Turning to the individual entities illustrated on FIG. 2A, each received video from camera 201A-N comprises a sequence of frames over time. The camera may be static (e.g., on a tripod) or dynamic (e.g., moving with a camera operator or electronically controlled).

Saliency detection modules 202A-N may be configured to determine salient features in a content of each video recorded by cameras 201A-N. Salient features may include visually prominent features (i.e., characteristic or notable features such as moving points of interest in a video). For example, in a sports event, a player moving with a ball may be considered as a salient feature in the content of the video.

Video retargeting modules 204A-N may be configured to retarget each video by imposing constraints that require a modified video to preserve salient features and objects. To retarget a video in order to preserve and zoom in on the salient features, a camera crop path may be estimated. The camera crop path may include a sequence of crop windows. Each crop window may be estimated to preserve and zoom in on the salient features in a respective video content. Estimating the sequence of crop windows associated with a crop path may be performed subject to constraints. An example of a constraint includes estimating the crop window to be of a pre-defined scale less than one with respect to an original frame size. Crop paths and the associated sequences of crop windows may be applied through the video retargeting modules 204A-N to videos to produce respective modified videos.

After video retargeting modules 204A-N apply respective crop paths to original videos to produce respective modified videos, view scoring modules 206A-N may be configured to assign action scores to each modified video at a given time. An action score may represent action content, which may be associated with the average motion magnitude of the salient features detected by the saliency detection modules 202A-N.

A single video may be produced or selected from multiple modified videos. At a given point in time, a view from one of the modified videos may be selected to be part of the single video. Based on action scores assigned by view scoring modules 206A-N, a view selection module 208 may be configured to select a view from a modified video at a given time t. The view selection module 208 may select the view according to certain criteria and constraints. An example of criteria may be the action scores assigned by modules 206A-N. An example of a constraint may be limiting switching between views from different videos. If the single video contains views from different modified videos over time, switching between the different modified videos in a short span of time may not provide viewers with a pleasant viewing experience. For example, at a given time t, the single video may contain a view from a given modified video. After a Δt time period, the single video may contain a view from a different given video. After another Δt time period, the single video may contain a view from yet another different given video. If Δt is a short amount of time (e.g., less than a second), switching between the different videos may not be desirable. Therefore, a constraint may be imposed through the view selection module 208 to not switch from a view associated with one video to a view associated with another video until a predetermined period of time has elapsed. Then, switching to a view from a different video may be enabled, for example.

Figure 2B:
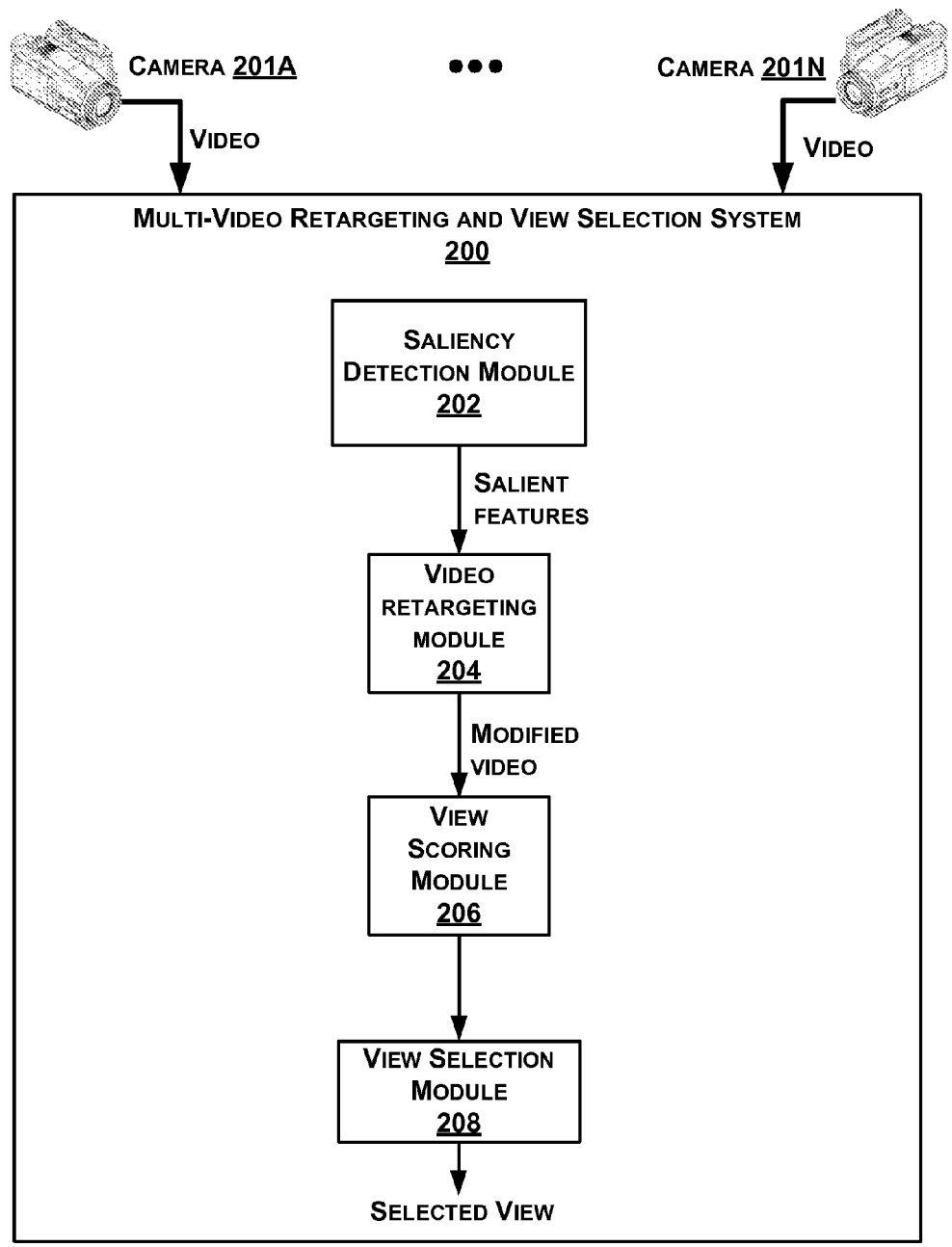

One or more of the described functions or components of the system 200 may be divided up into additional functional or physical components, or combined into fewer functional or physical components. For example, the embodiment in FIG. 2A shows multiple saliency detection modules 202A-N, multiple video retargeting modules 204A-N, and multiple view scoring modules 206A-N, one for each video. In another embodiment, shown in FIG. 2B, a single saliency detection module 202, single video retargeting module 204, and a single view scoring module 206 may be applied to all videos. View selection module 208 may be configured to select a view from a modified video at a given time t, as described above. In some further examples, additional functional and/or physical components may be added to the examples illustrated by FIG. 2A-2B. Still further, any of the saliency detection modules, 202 and 202A-N, the video retargeting modules 204 and 204A-N, and/or the view scoring modules 206 and 206A-N may include or be provided in the form of a processor (e.g., a microprocessor, a digital signal processor (DSP), etc.) configured to execute program code including one or more instructions for implementing logical functions described herein. The system 200 may further include any type of computer readable medium (e.g., non-transitory medium), for example, such as a storage device including a disk or hard drive, to store the program code.

Figure 3:
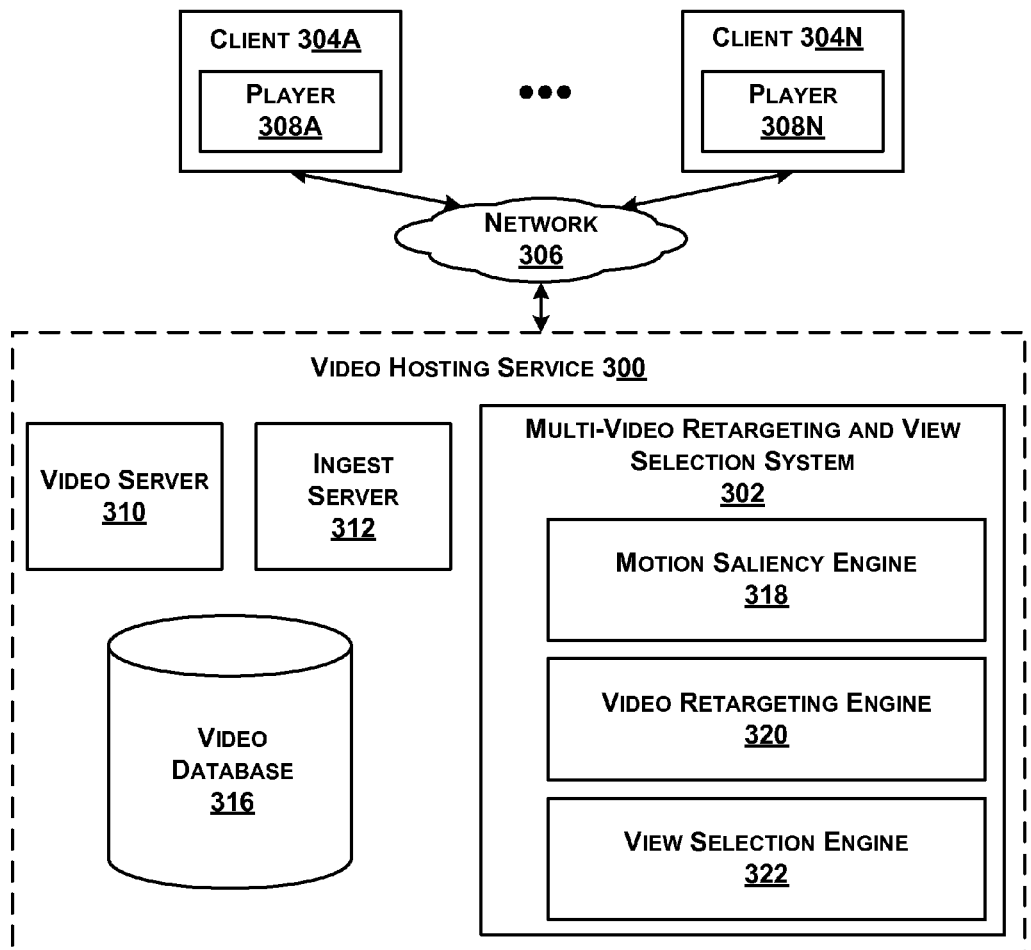
FIG. 3 is a block diagram illustrating an example system view of a video hosting service that includes a multi-video retargeting and view selection system.

FIG. 3 is a block diagram illustrates an example system view of a video hosting service 300 that includes a multi-video retargeting and view selection system 302. Multiple users/viewers may use clients 304A-N to send video hosting requests to the video hosting service 300, such as to upload videos to a video hosting website, and to receive the requested services from the video hosting service 300. The video hosting service 300 may be configured to communicate with the one or more clients 304A-N via a network 306. The video hosting service 300 may receive the video hosting service requests from the clients 304A-N over wired or wireless connections.

Turning to the individual entities illustrated on FIG. 3, each client 304A-N may be used by a user to request video hosting services. For example, users or camera operators can use the client 304A-N to send requests for uploading videos for processing. The clients 304A-N can include a camera or any type of computer device, such as a personal computer (e.g., desktop, notebook, tablet, laptop) computer, as well as devices such as a mobile telephone, personal digital assistant, or IP enabled video player, where videos are stored. The clients 304A-N may include a processor, a display device (or output to a display device), and a local storage, such as a hard drive or flash memory device to which the clients 304A-N store data used by the user in performing tasks, and a network interface for coupling to the video hosting service 300 via the network 306.

The clients 304A-N may include a video player 308A-N (e.g., the Flash™ player from Adobe Systems, Inc., or a proprietary one) for playing a video stream. The video player 308A-N may be a standalone application, or a plug-in to another application such as a network or Internet browser. Where the client 304A-N is a general purpose device (e.g., a desktop computer, mobile phone), the player 308A-N may be implemented as software executed by the computer. Where the client 304A-N is a dedicated device (e.g., a dedicated video player), the player 308A-N may be implemented in hardware, or a combination of hardware and software. The player 308A-N may include user interface controls (and corresponding application programming interfaces) for selecting a video feed, starting, stopping, and rewinding a video feed. Also, the player 308A-N can include in a user interface a video display format selection configured to indicate a video display format (e.g., a standard definition TV or a high-definition TV). Other types of user interface controls (e.g., buttons, keyboard controls) can be used as well to control the playback and video format selection functionality of the player 308A-N.

The network 306 enables communications between the clients 304A-N and the video hosting service 300. In one embodiment, the network 306 is the Internet, and uses standardized internetworking communications technologies and protocols, known now or subsequently developed, that enable the clients 304A-N to communicate with the video hosting service 300. In another embodiment, the network 306 may be a wireless cellular network that enables wireless communication between the clients 304A-N and the video hosting service 300.

The video hosting service 300 comprises the multi-video retargeting and view selection system 302, a video server 310, an ingest server 312, and a video database 316. The video server 310 may be configured to serve videos from the video database 316 in response to user video hosting service requests. The ingest server 312 may be configured to receive user uploaded videos and store the videos in the video database 316. The video database 316 may be configured to store user-uploaded videos and videos processed by the multi-video retargeting and view selection system 302. In one embodiment, the video database 316 stores a large video corpus.

The multi-video retargeting and view selection system 302 may include a motion saliency engine 318, a video retargeting engine 320, and a view selection engine 322. The multi-video retargeting and view selection system 302 may be configured to receive user uploaded videos from the ingest server 312, and to perform video retargeting and view selection.

II. Motion Saliency

Figure 4:
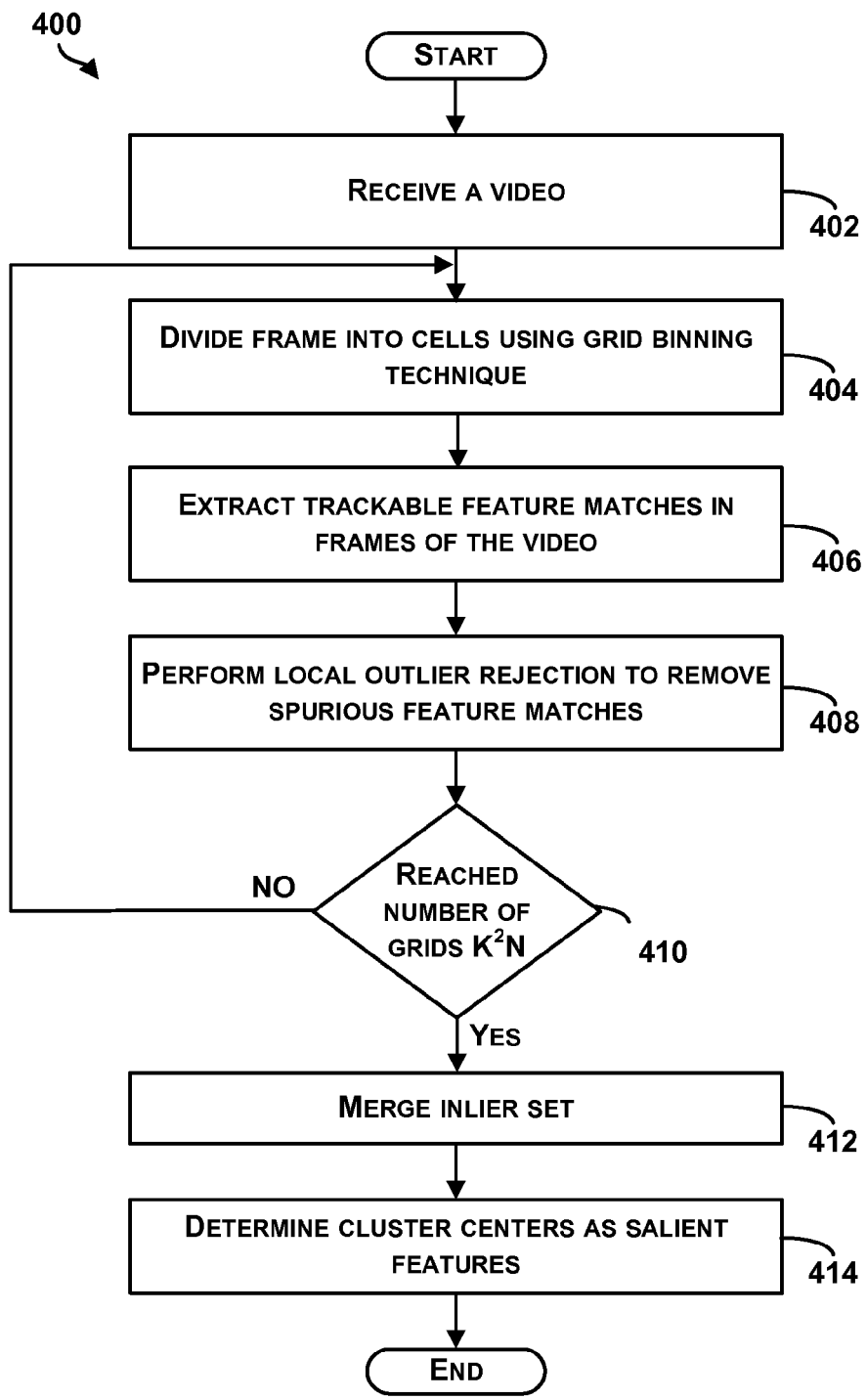
FIG. 4 is a block diagram of an example method to determine salient features in a video, in accordance with at least some embodiments described herein.

FIG. 4 is a block diagram of an example method 400 to determine salient features in a video, in accordance with at least some embodiments described herein. Method 400 shown in FIG. 4 presents an embodiment of a method that, for example, could be used with the systems 100, 200, and 300, and may be performed by a device, a server, or a combination of the device and the server. Method 400 may include one or more operations, functions, or actions as illustrated by one or more of blocks 402, 404, 406, 408, 410, 412, and 414. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 400 and other processes and methods disclosed herein, each block in FIG. 4 may represent circuitry that is wired to perform the specific logical functions in the process.

At block 402, the method 400 includes receive a video. In one example, the video may have been recorded by a camera, uploaded to and received by a server to be processed. In other examples, a video may be received and processed at a camera that is used to record the video. In still other examples, any computing device may be configured to receive the video via wired or wireless communication links from a video recording device that is used to record the video.

At block 404, the method 400 includes divide frame into cells using grid binning technique. A video has a sequence of frames and each frame may be divided by a grid into multiple cells. Each cell can be considered as a cluster containing trackable features. Grids of varying resolutions and offsets can be used. For a grid of size X, N cells having square bins of size $$X_i = \frac{X}{2^i}, i = 0 \ldots N - 1$$

can be created. To avoid aliasing issues, each grid may be shifted in x and y separately by K offsets of the form $$j \cdot \frac{X_i}{K}, j = 0 \ldots K - 1$$

giving a total of $K^2N$ grids.

Figure 5A:
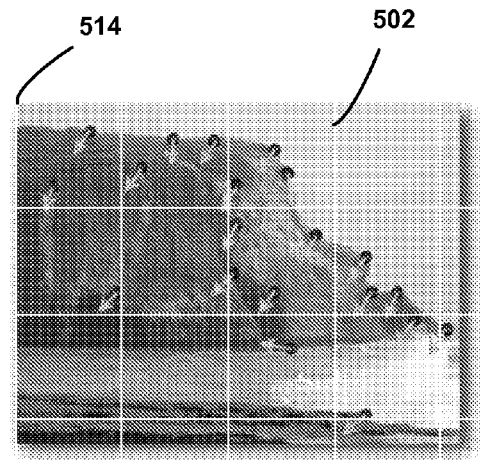
FIGS. 5A-5D illustrate example video frames and grids with different offsets and resolutions.
Figure 5B:
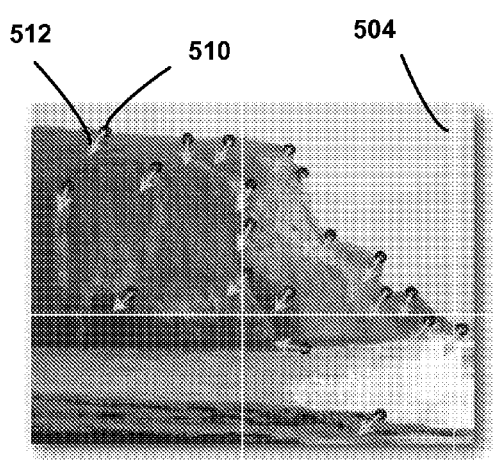
Figure 5C:
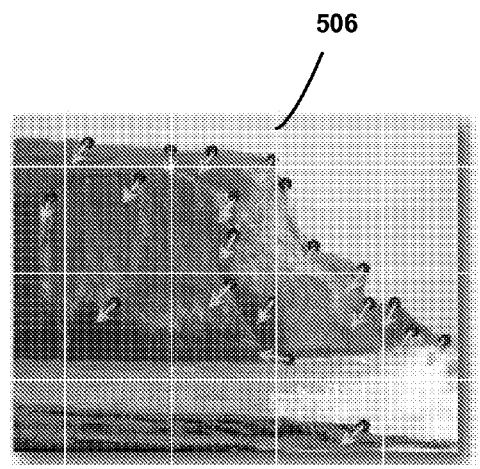
Figure 5D:
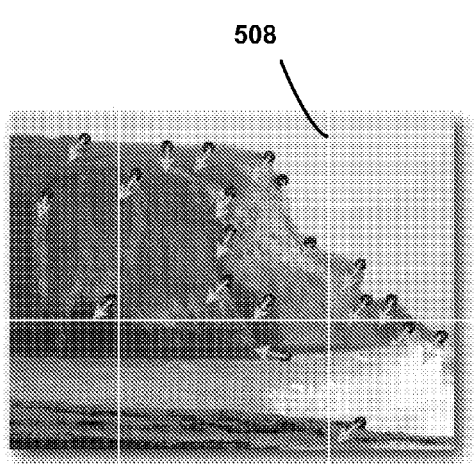

FIGS. 5A-5D illustrate example video frames and grids with different offsets and resolutions. FIG. 5A shows a grid 502 with square bins of size 50 pixels aligned to top-left picture corner 514. FIG. 5B shows a grid 504 with square bins of half the resolution of grid 502. FIG. 5C a grid 506 that is the same as grid 502, but shifted in x direction. FIG. 5D shows a grid 508 that is the same as grid 504, but shifted in x and y directions. Motion features $f_j=(l_j, v_j)$, composed of a feature location $l_j$ 510 (shown as a dot) and corresponding flow vector $v_j$ 512 (shown as an arrow) denoting the location of the feature in the previous frame can be binned using multiple grids. In one example, at block 404, a grid with a given resolution and offset, such as the grid examples shown in FIGS. 5A-5D, may be applied to a video frame to divide the frame into multiple clusters containing trackable features.

At block 406, the method 400 includes extract trackable feature matches in frames of the video. For example, trackable features in each frame of the video are extracted, or trackable features in substantially all frames of the video are extracted. Trackable features in frames of the video may be extracted using feature tracking software, such as the pyramidal Lucas-Kanade feature tracking. Features may be tracked from frame to frame using any number of methods. For example, if the video is a sequence of images, $I_1, I_2, \ldots I_n$, video frame pairs may be $(I_{t-1},$ and feature pairs between video frames may be extracted (e.g., for each feature x in frame $I_{t-1}$, a corresponding feature y at the same point in space as the feature x is found in frame $I_t$).

In another example, a set of flow vectors for each frame pair may be obtained. If, for example, the video was recorded by a static camera, flow vectors below a threshold (e.g., less than 0.05% of a frame diameter) can be removed. The remaining flow vectors may be considered as a set of trackable features $\{f_i=(l_i,v_i)\}$, where $l_i$ refers to the spatial location of the feature $f_i$ and $v_i$ refers to the feature's associated flow vector. In the case of a moving camera, a fundamental matrix constraint could be employed to remove features that correspond to static background motion.

In another example, small intra-frame motions and changes in illumination or brightness values of a small image patch (e.g., 7×7 pixels) centered around the feature point x in $I_{t-1}$ and the matching point y in $I_t$ may be nearly identical. For each feature x in $I_{t-1}$, a displacement vector d may be determined such that the $I_{t-1}(x)=I_t(x+d)$, and therefore x+d=y using the previous notation (e.g., that is feature matches (x<->y)). This expression can be linearized by Taylor Series expansion around x, yielding $DI_t(x)*d=I_{t-1}(x)-I_t(x)$ which is linear in the unknown displacement vector d. An over determined linear system of equations may be determined of the form A*d=b that can be then solved by using normal equations (i.e., solving the symmetric linear system $A^TA$ d=$A^T$b by Gaussian Elimination, where $A^T$ denotes the transpose of A). This process may be referred to as pyramidical Lucas-Kanade Tracking This process may be performed for all video frames of the video to determine multiple pairs of feature correspondences, i.e., each pair corresponding to a feature location in a first and a second frame, respectively.

At block 408, the method 400 includes perform local outlier rejection to remove spurious feature matches. Some of the feature-pair matches between video frames may be incorrect and can be removed. To remove feature-pairs matches that may have been incorrectly identified as a corresponding pairs, an algorithm, such as random sample consensus (RANSAC), may be used. The algorithm may identify outliers within a set of observed data.

In one example, for each cluster or bin of a given grid, outlier sets may be rejected and inlier sets may be determined. One feature $f_j=(l_1, v_j)$ may be picked randomly from the cluster. A set of feature flow vectors $\{v_1, \ldots, v_n\}$ may be determined within the cluster that agrees with $v_j$ within a small threshold $\epsilon$ such that $|v_i-f|<\epsilon, \forall i=1 \ldots n$, where $\epsilon$ equals a number of pixels (e.g., 2 pixels). This computed set can be referred to as the inlier set. The inlier set with the highest cardinality may be selected after a number of iterations (e.g., a fixed number of iterations). A cluster center may then be re-estimated by averaging the locations of the features in the inlier set. The new cluster center is equal to $\Sigma_{i=1...n}l_i$ where $l_i$, for i=1 . . . n, are the feature locations of the largest inlier set. The cluster centers serve as motion saliency points and can be weighted by the average motion magnitude $\Sigma_{i=1...n}|v_i|$ within each cluster.

At decision block 410, method 400 includes reached number of grids $K^2N$. The described outlier rejection and inlier set determination method may be performed for all clusters of a grid and repeated for all grids until at total number of grids $K^2N$ is reached. Examples of such grids are shown in FIG. 5.

At block 412, method 400 includes merge inlier set. The inlier sets can be merged across all $K^2N$ grids, which can be performed in linear complexity using hashing or log-linear complexity by lexicographically sorting feature locations. Merging inlier sets may include re-evaluating cluster centers and salient features. In one example, a grid G of fixed binning may be selected (e.g., a grid with zero offsets and finest resolution). Inliers sets obtained from all $K^2N$ grids may be binned into the grid G. Cluster centers and motion magnitude may be determined for each bin by averaging inlier features locations and motion magnitudes. Averaging may result in tuples of the form [cluster center, motion magnitude]). The tuples may be used as salient features. In another example, inlier sets obtained from all $K^2N$ grids may be binned into regions obtained from an image or a video segmentation algorithm. Cluster centers and motion magnitude may also be determined by averaging. In addition or alternatively, a centroid of a region may be used as cluster center. In yet another example, a clustering algorithm such as k-means may be applied to inlier sets obtained from all $K^2N$ grids to yield a pre-defined number of k clusters. The pre-defined number of k clusters may include k=1 clusters, i.e. using a frame-global average of inlier feature locations to yield a single saliency point.

At block 414, method 400 includes determine cluster centers as salient features. The merged inlier features are binned into a grid with zero offset in x and y of finest resolution $X_{N-1}$, and the cluster centers are used as motion saliency points or salient features. In one example, a center point of a cluster is determined to be a salient feature point. In other examples, an area surrounding a center point of a cluster may be determined to include salient feature points, and the area may be a circle, square, or other geometric shapes.

III. Video Retargeting

Video retargeting includes processing videos to generate modified videos that may zoom-in on and/or preserve the salient features. In one example, video retargeting comprises estimating a crop path C(t) that comprises a sequence of crop windows to be applied to a video. The sequence of crop windows can be applied to a sequence of frames of the video to generate the modified video. The crop path, for example, may be estimated to preserve the salient features in a video content while adhering to cinematographic principles such as smoothness. Thus, the crop path may comprise constant, linear, and parabolic segments that may ensure the smoothness of the resulting modified video.

Figure 6:
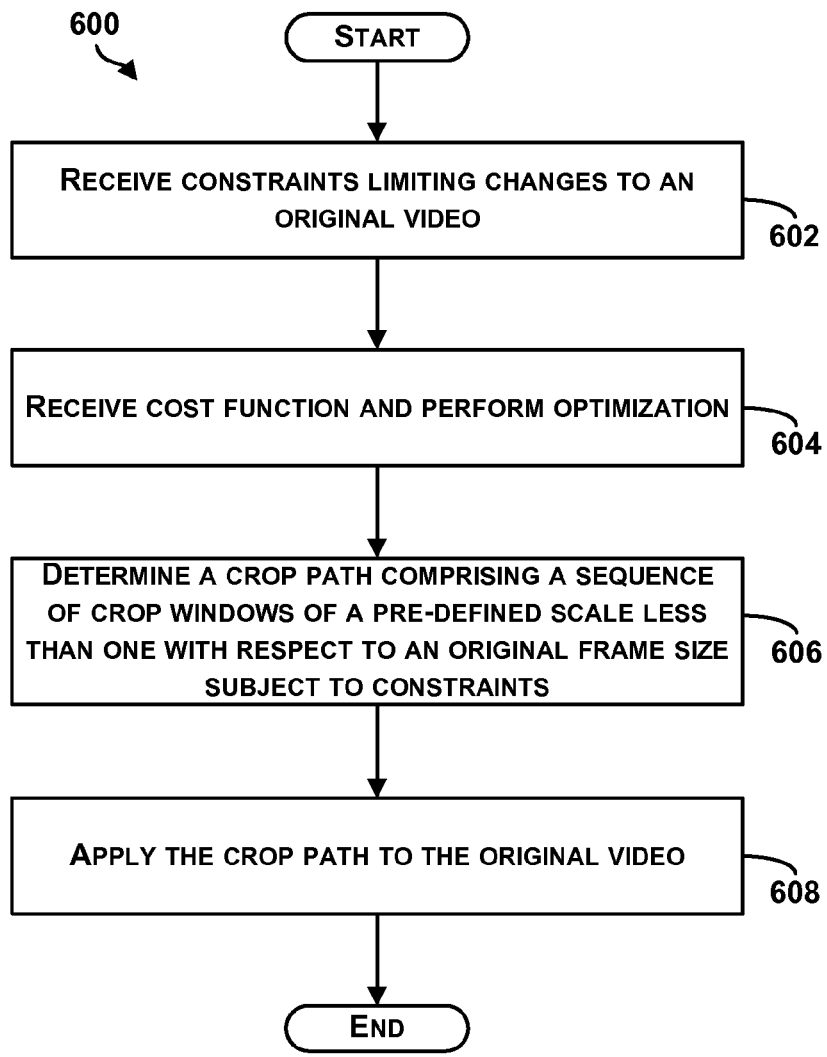
FIG. 6 illustrates a block diagram of an example method for video retargeting, in accordance with at least some embodiments described herein.

FIG. 6 is a block diagram of an example method for video retargeting, in accordance with at least some embodiments described herein. Retargeting a video may comprise estimating a crop path to be applied to a video to generate a modified video preserving the salient features in a content of the video. Method 600 shown in FIG. 6 presents an embodiment of a method that, for example, could be used with the systems 100, 200, and 300, and may be performed by a device, a server, or a combination of the device and the server. Method 600 may include one or more operations, functions, or actions as illustrated by one or more of blocks 602-608. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

A crop path C(t), t=1, . . . n, with n being a total number of frames in a video, may be described mathematically as a linear similarity transform $A_t$ for each frame t, with $A_t$ being unknown. $A_t$ applied to a point $x=(x_1, x_2)^T$ can be described by the following equation:

$$A_t x = \begin{pmatrix} a_t & -b_t \\ b_t & a_t \end{pmatrix} \begin{pmatrix} x_1 \\ x_2 \end{pmatrix} + \begin{pmatrix} dx_t \\ dy_t \end{pmatrix} \qquad \text{Equation (1)}$$

where $a_t$, $b_t$, $dx_t$, and $dy_t$ are scalar factors that define the linear similarity transform $A_t$. These scalar factors may apply a combined scale, rotation and translation transformation on each point $x=(x_1, x_2)^T$ in frame t. An optimal crop path may be computed by optimizing a weighted combination of first to third derivatives of the crop path in L1 norm using linear programming technique subject a variety of linear constraints. Determining the optimal crop path and an associated sequence of crop windows may be performed by an optimization as described in method 600, for example.

At block 602 of FIG. 6, the method 600 includes receive constraints limiting changes to an original video. The constraints may include forcing the crop windows that the crop path comprises to be included within original frames of a respective video. The crop windows may have a pre-defined size. Also, the crop windows may be constrained to include the salient features determined by the motion saliency method described in FIG. 4.

At block 604, the method 600 includes receive cost function and perform the optimization. The cost function may be a weighted combination of the first to third derivatives of the crop path as mentioned above and can be described mathematically by the following equation:

$$a\left|\frac{dC}{dt}\right| + b\left|\frac{d^2C}{dt^2}\right| + c\left|\frac{d^3C}{dt^3}\right| \qquad \text{Equation (2)}$$

Another constraint, which may be received at block 602, may comprise restricting the size of the crop windows to zoom-in on action in frames of a respective video and include a first threshold number of salient features (e.g., or less than a first threshold of salient features) as opposed to zooming out away from action. The optimization may also attempt to determine crop windows large enough to include as many salient features as possible in the crop windows or to include a second threshold number of salient features. To balance an objective of zooming in on action with an objective of including as many salient features as possible, a contraction objective may be added to the optimization problem. Adding the contraction objective may be accomplished by adding the scale factor $a_t$, in equation (1) weighted by 0.5 or other values to the objective function in equation (2).

At block 606, method 600 includes determine a crop path comprising a sequence of crop windows of a pre-defined scale less than one with respect to the original frame size subject to constraints. The optimization can be performed and results in an optimal crop path subject to the constraints. The optimal crop path comprises a sequence of crop windows that fit inside original frames of the respective video.

At block 608, the method 600 includes apply the crop path to the original video. The optimal crop path may be applied to an original video to generate a modified video. The modified video includes the salient features and may zoom in on the salient features. The method in FIG. 6 may be performed on each original video received and a respective modified video may be generated for each original received video. In other example, the method may be performed on portions of each video, or on groups of videos to generated respective modified videos.

Figure 7A:
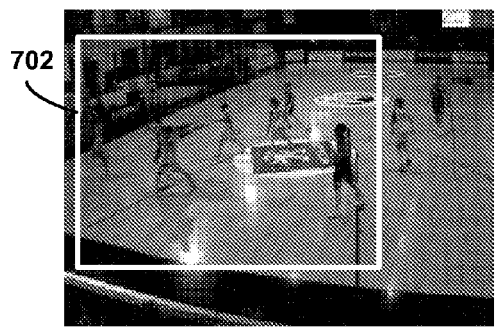
FIGS. 7A-7D illustrate example video frames and video retargeting results.
Figure 7C:
Figure 7B:
Figure 7B:
Figure 7B:
Figure 7D:
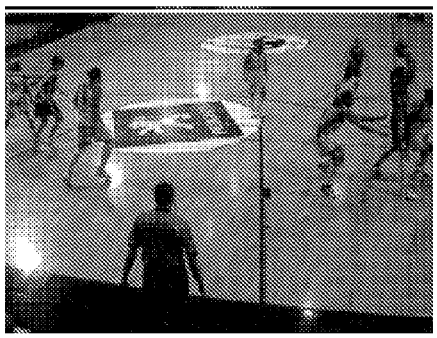

FIGS. 7A-7D illustrate example video frames and video retargeting results. FIG. 7A shows an original frame obtained from a received video. FIG. 7B shows a modified frame after crop window 702 estimated as part of an optimal crop path as described in the method of FIG. 6 is applied to the original frame in FIG. 7A. It is noted that the modified frame in FIG. 7B zooms in on action or the salient features in the original frame. Also, FIG. 7C shows an original frame obtained from a received video. FIG. 7D shows a modified frame after a crop window 704 is applied to the original frame in FIG. 7C. It is noted that the modified frame in FIG. 7D zooms in on action or the salient features in the original frame.

IV. View Selection

A single video may be generated from multiple modified videos. At a given time a view from the multiple modified videos may be selected to be part of the single video. The view may include a single frame or a portion of a respective video.

Selecting a view may comprise evaluating action content in a portion of a respective video and assigning an action score that represents an average motion magnitude of the salient features included in the given video. This selection may be subject to constraints. In one example, if the selection comprises multiple switching between frames of different videos in a short span of time to produce a single video, the single video may not represent a pleasant viewing experience. Transitioning between frames or views from multiple videos may be optimized to adhere to cinematographic principles and providing an acceptable viewing experience.

Figure 8:
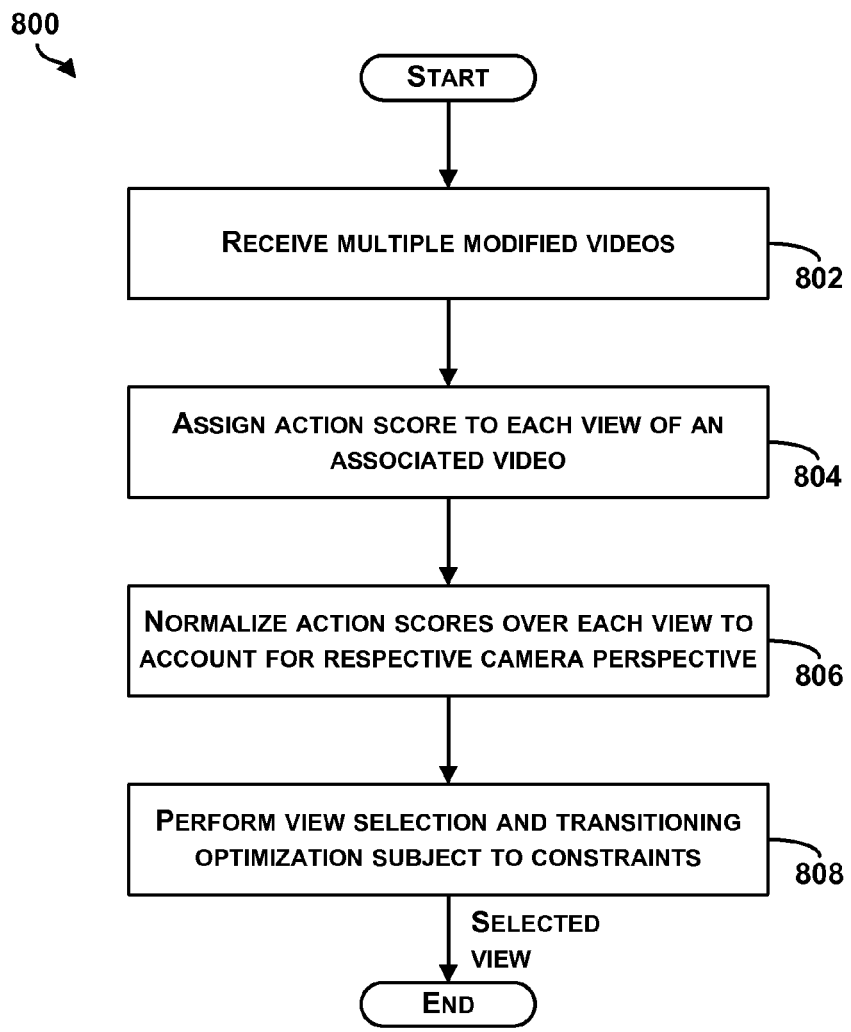
FIG. 8 illustrates a block diagram of an example method for view selection, in accordance with at least some embodiments described herein.

FIG. 8 illustrates a block diagram of an example method for view selection, in accordance with at least some embodiments described herein. Method 800 shown in FIG. 8 presents an embodiment of a method that, for example, could be used with the systems 100, 200, and 300, for example, and may be performed by a device, a server, or a combination of the device and server. Method 800 may include one or more operations, functions, or actions as illustrated by one or more of blocks 802-808. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 802, method 800 includes receive multiple modified videos. The multiple modified videos may have been processed by the motion saliency and video retargeting methods of FIGS. 4 and 6.

At block 804, method 800 includes assign action score to each view of an associated video. A view may be a single frame or a portion of respective video. Each of the multiple modified videos comprises a sequence of frames. For each frame i of a modified video v, an action score $a_v(i)$ is assigned. The action score $a_v(i)$ may be an average motion magnitude of salient features in a content of a view from the modified video: $a_v(i) = \Sigma_{i=1\ldots n} |v_i|$.

In one example, a camera used to record an original video, which may be retargeted to generate one of the multiple modified videos, may have had a biased view or a different perspective compared to other cameras. For example, a camera that is closer to a sports field may have salient features with larger motion magnitude content than a camera that is not close to the sports field. To account for this bias, method 800 at block 806 includes normalize action scores over each view to account for respective camera perspective. Normalizing action scores may include dividing the action scores by a common variable in order to negate the effect of camera perspective on the action scores. Action score normalization may include normalization by average motion magnitude summed over all frames or summed over a temporal window. Normalization may allow action scores of different views from different cameras with different perspectives to be compared on a common scale. In another example, if prior knowledge about cameras locations setup exists, a negative penalty can be added to an action score assigned to frame of a video recorded by a camera with a biased perspective of an event being recorded.

At block 808 the method 800 includes perform view selection and transitioning optimization subject to constraints. Selecting a frame from one of the multiple modified videos can be formulated as an optimization subjected to constraints. An objective function for the optimization may be maximizing the action score of the frame being selected. This optimization may be subject to constraints, however, to take into consideration, for example, optimal transitioning from one frame of a given video to another frame from another given video. Limiting switching between frames from different videos may be necessary for an acceptable viewing experience.

The optimization may employ a dynamic programming technique or other optimization algorithms such as sequential quadratic programming or genetic algorithms. A negative switching penalty $w_v$ may be associated with frames of each video v. Over time, the negative switching penalty may decay and switching may become more acceptable. The decaying negative switching penalty can be described for a given frame i at a given point in time by the following equation:

$$w_v(i) = -C\frac{1}{d^i} \quad \text{Equation (3)}$$

C and d are constants that may be selected depending on how fast the decay of the negative switching penalty may be desired. Example values for C and d may be C=500, and d=1.03. For these values, the optimization may prohibit transitioning from a frame of a given video to another frame of another given video in a time period of 1 second approximately. As time passes, the switching penalty value decreases and transitioning to frames from other videos becomes possible and acceptable.

The dynamic programming formulation of the optimization may compute an accumulated action score $s_v(i)$ over frames of each video v, while accounting for switching penalties. Assuming $s_v(j)$ is computed for all j<i, the accumulated action score can be expressed as:

$$s_v(i) = \quad \text{Equation (4)}$$
$$a_v(i) + \max\_\{u : \text{views}\}[s_u(i-1) + (1 - \Delta(v, u)) * w_u(i-1)]$$
$$\text{Where} \quad \Delta(v, u) = \begin{cases} 1 & \text{if } v == u \\ 0 & \text{otherwise} \end{cases}$$

So, to compute $s_v(i)$, the previous view with the highest $s_u(i-1)$ may be selected and added to the action score $s_v(i)$. If there is a change of views $v \neq u$, implying an imminent switching from a frame associated with a given video to a frame from another given video, the negative switching penalty $w_u(i)$ of the frame being switched from can be added, as opposed to the penalty $w_v(i)$ of the frame potentially being switched to. If switching is optimal, a switching penalty of the frame switched to is reset to—C, decaying over time as described by equation (3).

Figure 9:
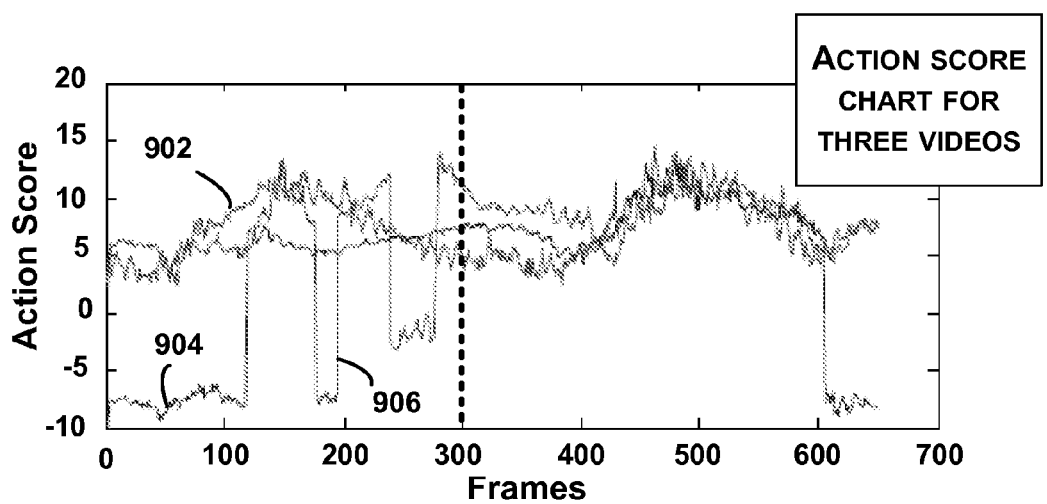
FIG. 9 illustrates an example action score chart.

Action scores may be assigned to frames of multiple given videos over time. FIG. 9 shows an example action score chart. The action score chart shows example normalized action scores assigned to frames of three videos over time. Line 902 represents assigned action scores over time for frames of a first video. Line 904 represents assigned action scores over time for frames of a second video. Line 906 represents assigned action scores over time for frames of a third video. X-axis of the action score chart in FIG. 9 shows frame numbers. For example, the action score chart shows more than 600 frames for each video. Y-axis shows action scores assigned to frames of a given video. The three videos may be synchronized. For instance, at a 300$^{th}$ frame of each video, an action score may be assigned. The action score chart in FIG. 9 shows that the 300$^{th}$ frame of the third video has a higher action score (line 906), than action score of the second video (line 904), which has a higher action score than the first video (line 902). Therefore, at a given point in time represented by the 300$^{th}$ frame of each video, the third video has the highest action score.

Figure 10:
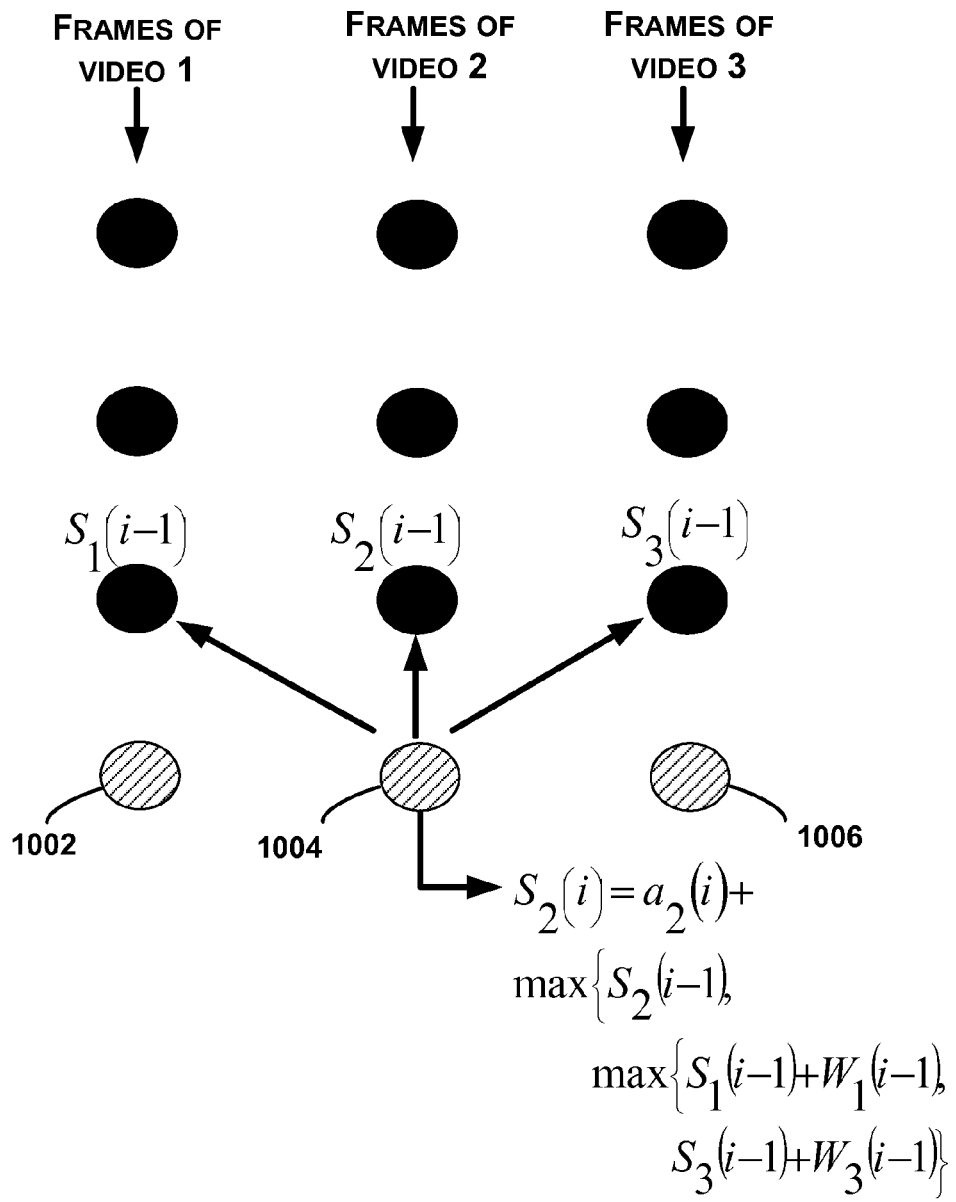
FIG. 10 illustrates an example of applying a dynamic programming optimization method subject to constraints in order to select an optimal view.

FIG. 10 illustrates an example of applying a dynamic programming optimization method subject to constraints in order to select an optimal view. i$^{th}$ frames 1002, 1004, and 1006 from three videos are shown as hatched circles. Previous frames (e.g., i–1) are shown as black circles. An example action score calculation is shown for the i$^{th}$ frame of the second video (i.e., $s_2(i)$) according to the dynamic programming technique described above. A similar calculation may be performed for all frames at a given point in time for all videos to select an optimal view at a given point in time.

This optimization can be implemented in real-time as videos are being received. The optimization may also be applied to post process recorded videos. In the case of post processing recorded videos, an accumulated score $s_v(i)$ may be computed for all frames of a given video, and optimal views and transitioning points are found by backtracking through the recorded videos.

Figure 11:
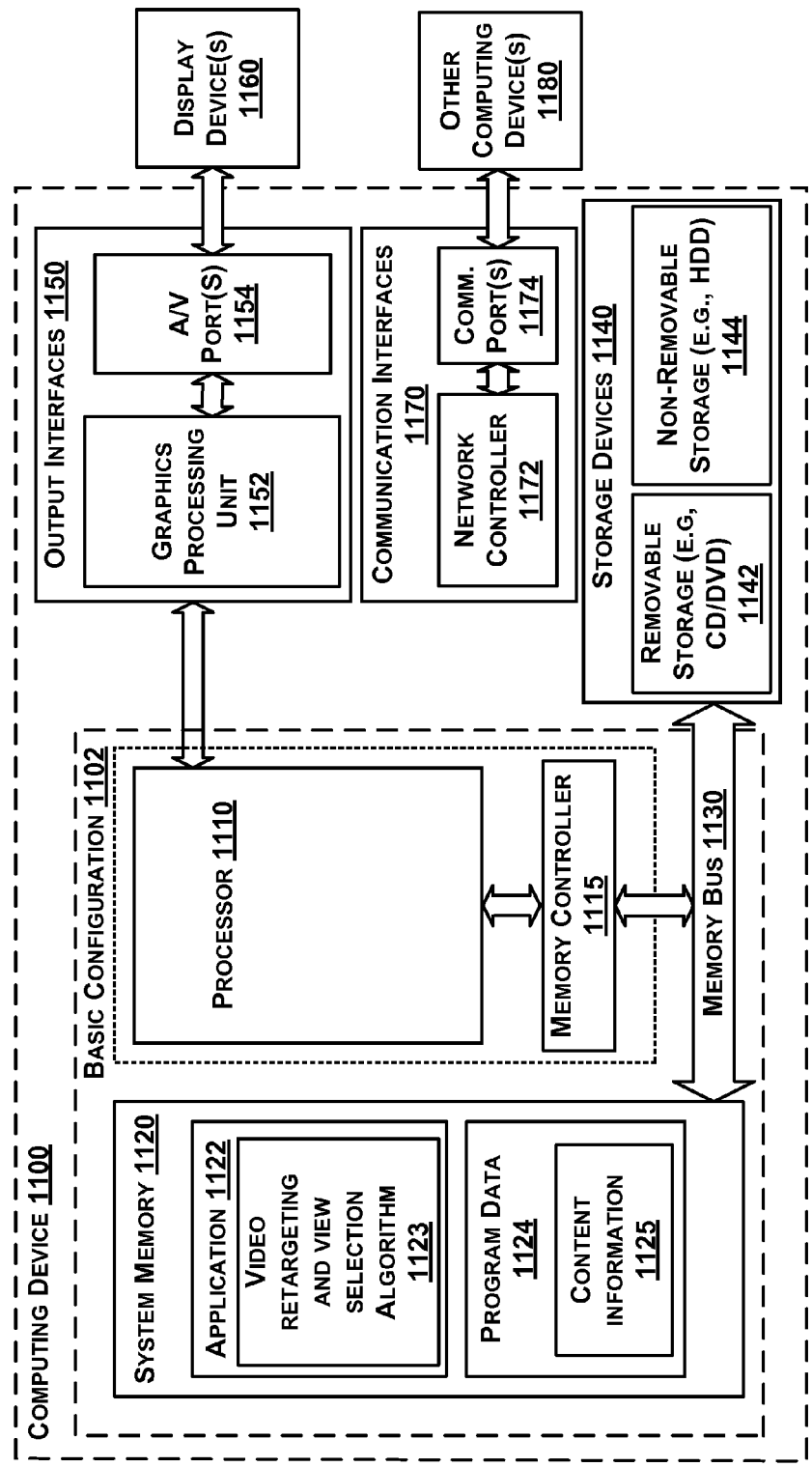
FIG. 11 is a functional block diagram illustrating an example computing device used in a computing system that is arranged in accordance with at least some embodiments described herein.

FIG. 11 is a functional block diagram illustrating an example computing device 1100 used in a computing system that is arranged in accordance with at least some embodiments described herein. The computing device may be a personal computer, mobile device, cellular phone, video game system, or global positioning system, and may be implemented as a client device, a server, a system, a combination thereof, or as a portion of components described in FIGS. 1-3. In a basic configuration 1102, computing device 1100 may include one or more processors 1110 and system memory 1120. A memory bus 1130 can be used for communicating between the processor 1110 and the system memory 1120. Depending on the desired configuration, processor 1110 can be of any type including but not limited to a microprocessor (μP), a microcontroller (μC), a digital signal processor (DSP), or any combination thereof A memory controller 1115 can also be used with the processor 1110, or in some implementations, the memory controller 1115 can be an internal part of the processor 1110.

Depending on the desired configuration, the system memory 1120 can be of any type including but not limited to volatile memory (such as RAM), non-volatile memory (such as ROM, flash memory, etc.) or any combination thereof. System memory 1120 may include one or more applications 1122, and program data 1124. Application 1122 may include a video retargeting and view selection algorithm 1123 that is arranged to provide inputs to the electronic circuits, in accordance with the present disclosure. Program Data 1124 may include video content information 1125 that could be directed to any number of types of data. In some example embodiments, application 1122 can be arranged to operate with program data 1124 on an operating system.

Computing device 1100 can have additional features or functionality, and additional interfaces to facilitate communications between the basic configuration 1102 and any devices and interfaces. For example, data storage devices 1140 can be provided including removable storage devices 1142, non-removable storage devices 1144, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 1120 and storage devices 1140 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of device 1100.

Computing device 1100 can also include output interfaces 1150 that may include a graphics processing unit 1152, which can be configured to communicate to various external devices such as display devices 1160 or speakers via one or more A/V ports 1154 or a communication interface 1170. The communication interface 1170 may include a network controller 1172, which can be arranged to facilitate communications with one or more other computing devices 1180 over a network communication via one or more communication ports 1174. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of characteristics set of the signal or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 1100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 can also be implemented as a personal computer including both laptop computer and non-laptop computer configurations.

In some embodiments, the disclosed methods may be implemented as computer program instructions encoded on a computer-readable storage media in a machine-readable format, or on other non-transitory media or articles of manufacture. FIG. 12 is a schematic illustrating a conceptual partial view of an example computer program product 1200 that includes a computer program for executing a computer process on a computing device, arranged according to at least some embodiments presented herein. In one embodiment, the example computer program product 1200 is provided using a signal bearing medium 1201. The signal bearing medium 1201 may include one or more program instructions 1202 that, when executed by one or more processors may provide functionality or portions of the functionality described above with respect to FIGS. 1-11. Thus, for example, referring to the embodiments shown in FIGS. 4 and 6, one or more features of blocks 402-414 and/or blocks 602-608 may be undertaken by one or more instructions associated with the signal bearing medium 1201. In addition, the program instructions 1202 in FIG. 12 describe example instructions as well.

In some examples, the signal bearing medium 1201 may encompass a computer-readable medium 1203, such as, but not limited to, a hard disk drive, a Compact Disc (CD), a Digital Video Disk (DVD), a digital tape, memory, etc. In some implementations, the signal bearing medium 1201 may encompass a computer recordable medium 1204, such as, but not limited to, memory, read/write (R/W) CDs, R/W DVDs, etc. In some implementations, the signal bearing medium 1201 may encompass a communications medium 1205, such as, but not limited to, a digital and/or an analog communication medium (e.g., a fiber optic cable, a waveguide, a wired communications link, a wireless communication link, etc.). Thus, for example, the signal bearing medium 1201 may be conveyed by a wireless form of the communications medium 1205 (e.g., a wireless communications medium conforming to the IEEE 802.11 standard or other transmission protocol).

The one or more programming instructions 1202 may be, for example, computer executable and/or logic implemented instructions. In some examples, a computing device such as the computing device 1100 of FIG. 11 may be configured to provide various operations, functions, or actions in response to the programming instructions 1202 conveyed to the computing device 1100 by one or more of the computer readable medium 1203, the computer recordable medium 1204, and/or the communications medium 1205.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving a plurality of videos, each video comprising a sequence of frames;
determining salient features in a content of each video, wherein the salient features include features selected based on motion content of the features over the sequence of frames;
determining a camera crop path for each video, wherein the camera crop path comprises a sequence of crop windows, the sequence of crop windows including the salient features;
applying the sequence of crop windows for each video to the sequence of frames of each video to generate a modified video for each video including the salient features of each respective video;
determining an action score associated with a portion of each modified video, wherein the action score is based on an average motion magnitude of the salient features in the portion of each modified video; and
based on the action score of each modified video, selecting one of the modified videos, wherein selecting the one of the modified videos comprises performing an optimization over time to select the one of the modified videos, and wherein the optimization is subject to a constraint to limit switching between the modified videos.

2. The method of claim 1, wherein determining the camera crop path for each video comprises determining a crop window of a pre-defined size, wherein the crop window is defined to fit inside an original frame that is in a received video.

3. The method of claim 2, wherein determining the crop window of the pre-defined size comprises determining a size of the crop window large enough to include at least a threshold number of salient features.

4. The method of claim 2, wherein determining the crop window of the pre-defined size comprises:
determining a size of the crop window large enough to include at least a first threshold number of salient features; and
restricting the size of the crop window such that the crop window includes a second threshold number of salient features.

5. The method of claim 1, wherein determining the camera crop path comprises determining a given camera crop path comprising at least one of constant, linear, or parabolic segments.

6. The method of claim 1, wherein determining the sequence of crop windows comprises optimizing a weighted combination of a first derivative, a second derivative, and a third derivative of the camera crop path.

7. The method of claim 6, wherein optimizing the weighted combination of the first derivative, the second derivative, and the third derivative of the camera crop path comprises performing an L1 optimization subject to at least one constraint.

8. The method of claim 7, wherein the at least one constraint comprises an inclusion constraint that requires a given crop window to be contained within an original frame of a received video at all times.

9. The method of claim 1, wherein applying the sequence of crop windows of each video to the sequence of frames of each video to generate a modified video for each video including the salient features comprises removing content from frames of the respective video.

10. The method of claim 1, wherein determining the salient features in the content of each frame of each video comprises:
- dividing the frame into a grid having multiple cells;
- performing local outlier rejection to remove non-salient features in each cell; and
- determining centers of each cell as a given salient feature.

11. The method of claim 1, wherein determining the action score associated with the portion of each modified video comprises normalizing over each potion to account for a perspective of a camera used to record an associated video.

12. The method of claim 1, further comprising generating a display comprising content of the plurality of videos, wherein the display portrays content of the selected modified video at a given point in time.

13. The method of claim 1, wherein the constraint includes associating the portion of each modified video with a negative switching penalty that decreases over time.

14. The method of claim 1, wherein the portion of each modified video includes a single frame.

15. The method of claim 1, wherein the portion of each modified video includes multiple frames.

16. The method of claim 1, wherein determining salient features in the content of each video comprises determining features of frames of each video that remain in respective frames of each video over the sequence of frames.

17. The method of claim 1, wherein receiving the plurality of videos comprises receiving a video from each of a plurality of non-moving cameras, and wherein the salient features in the content of each video include features that move in position relative to a background of the content of each video over the sequence of frames.

18. A non-transitory computer readable medium having stored therein instructions that, in response to execution by a computing device, cause the computing device to perform operations comprising:
- receiving a plurality of videos, each video comprising a sequence of frames;
- determining salient features in a content of each video, wherein the salient features include features selected based on motion content of the features over the sequence of frames;
- determining a camera crop path for each video, wherein the camera crop path comprises a sequence of crop windows, the sequence of crop windows including the salient features;
- applying the sequence of crop windows for each video to the sequence of frames of each video to generate a modified video for each video including the salient features of each respective video;
- determining an action score associated with a portion of each modified video, wherein the action score is based on an average motion magnitude of the salient features in the portion of each modified video; and
- based on the action score of each modified video, selecting one of the modified videos, wherein selecting the one of the modified videos comprises performing an optimization over time to select the one of the modified videos, and wherein the optimization is subject to a constraint to limit switching between the modified videos.

19. The non-transitory computer readable medium of claim 18, wherein the operation of determining the camera crop path for each video comprises determining a crop window of a pre-defined size, wherein the crop window is defined to fit inside an original frame that is in a received video, and wherein the crop window includes at least a threshold number of salient features.

20. The non-transitory computer readable medium of claim 18, wherein the instructions, in response to execution by the computing device, further cause the computing device to perform operations comprising generating a display comprising content of the plurality of videos, wherein the display portrays content of the selected modified video at a given point in time.

21. A system comprising:
- a motion saliency engine configured to receive a plurality of videos and to determine salient features in a content of each video, wherein the salient features include features selected based on motion content of the features over the sequence of frames;
- a video retargeting engine in communication with the motion saliency engine and configured to determine a camera crop path for each video, wherein the camera crop path comprises a sequence of crop windows, the sequence of crop windows including the salient features, wherein the video retargeting engine is further configured to apply the sequence of crop windows for each video to the sequence of frames of each video to generate a modified video for each video including the salient features of each respective video; and
- a view selection engine in communication with the motion saliency engine and the video retargeting engine and configured to determine an action score associated with a portion of each modified video, wherein the action score is based on an average motion magnitude of the salient features in the portion of each modified video, wherein the view selection engine is further configured to select one of the modified videos based on the action score of each modified video, wherein to select the one of the modified videos the view selection engine is configured to perform an optimization over time to select the one of the modified videos, and wherein the optimization is subject to a constraint to limit switching between the modified videos.

22. The system of claim 21, wherein the motion saliency engine is further configured to divide a frame of a given video into a grid having multiple cells, to perform local outlier rejection to remove non-salient features in each cell, and to determine centers of each cell as a given salient feature.

* * * * *